(12) United States Patent
Leachman et al.

(10) Patent No.: US 9,777,889 B2
(45) Date of Patent: Oct. 3, 2017

(54) VAPOR COOLED SHIELDING LINER FOR CRYOGENIC STORAGE IN COMPOSITE PRESSURE VESSELS

(71) Applicant: Washington State University, Pulllman, WA (US)

(72) Inventors: Jacob William Leachman, Pullman, WA (US); Patrick Marshall Adam, Pullman, WA (US)

(73) Assignee: Washington State University, Pullman, WA (US)

( * ) Notice: Subject to any disclaimer, the term of this patent is extended or adjusted under 35 U.S.C. 154(b) by 125 days.

(21) Appl. No.: 14/810,597

(22) Filed: Jul. 28, 2015

(65) Prior Publication Data

US 2016/0033083 A1    Feb. 4, 2016

Related U.S. Application Data

(60) Provisional application No. 62/033,028, filed on Aug. 4, 2014.

(51) Int. Cl.
*F17C 1/00* (2006.01)
*F17C 3/04* (2006.01)

(52) U.S. Cl.
CPC ........ *F17C 3/04* (2013.01); *F17C 2201/0119* (2013.01); *F17C 2201/054* (2013.01); *F17C 2201/056* (2013.01); *F17C 2203/0366* (2013.01); *F17C 2203/0375* (2013.01); *F17C 2203/0387* (2013.01); *F17C 2203/0604* (2013.01); *F17C 2203/0631* (2013.01); *F17C 2203/0663* (2013.01); *F17C 2221/012* (2013.01); *F17C 2223/0161* (2013.01); *F17C 2223/033* (2013.01); *F17C 2260/033* (2013.01); *F17C 2270/0105* (2013.01); *F17C 2270/0168* (2013.01); *F17C 2270/0186* (2013.01); *Y02E 60/321* (2013.01)

(58) Field of Classification Search
CPC ........ F17C 2221/012; F17C 2270/0184; F17C 2203/0604; F17C 2223/0161
See application file for complete search history.

(56) References Cited

U.S. PATENT DOCUMENTS

| 3,304,728 A | * | 2/1967 | De Haan | B21C 37/101 |
|---|---|---|---|---|
| | | | | 62/48.3 |
| 2002/0041823 A1 | * | 4/2002 | Blaszczyk | C01B 3/00 |
| | | | | 422/1 |
| 2015/0167891 A1 | * | 6/2015 | Nettis | F17C 1/002 |
| | | | | 114/74 R |

* cited by examiner

*Primary Examiner* — Shawn M Braden
(74) *Attorney, Agent, or Firm* — Whitham, Curtis & Cook, P.C.

(57) ABSTRACT

A novel tank cryogenic-compatible composite pressure vessel that beneficially utilizes Vapor Cooled Shielding (VCS) is introduced to minimize thermal gradients along support structures and reduces heat loads on cryogenic systems. In particular, the configurations and mechanisms to be utilized herein include: providing for a desired number of passageways and a given thickness of the VCS, reducing the thermal conductivity of the VCS material, and increasing the cooling capacitance of the hydrogen vapors.

18 Claims, 3 Drawing Sheets

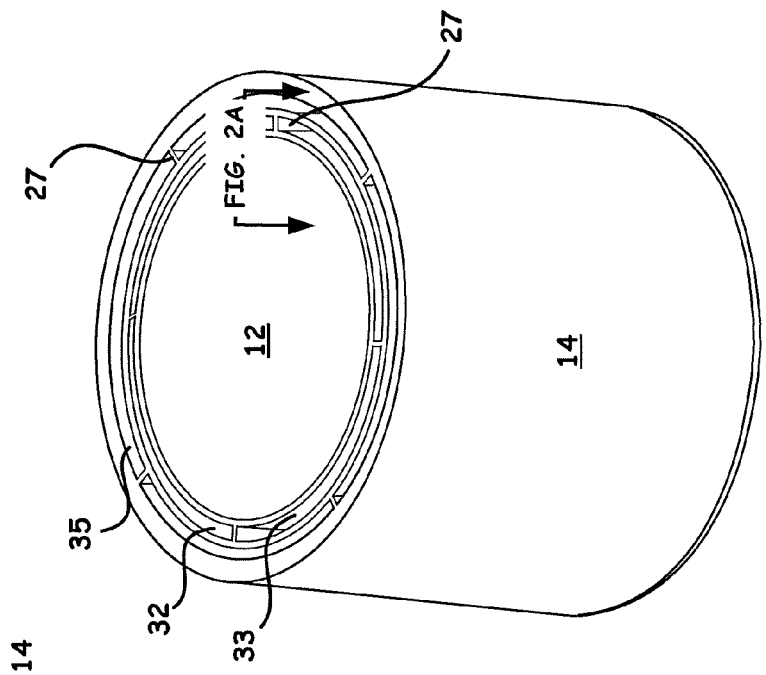
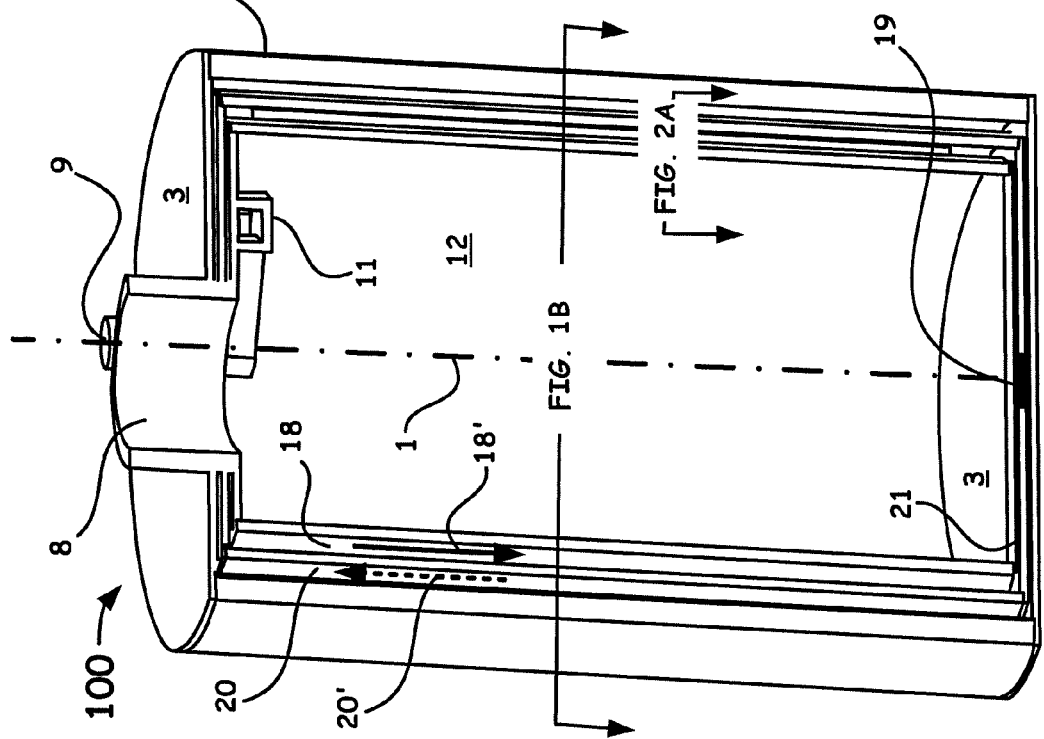

VAPOR COOLED SHIELDING LINER FOR CRYOGENIC STORAGE IN COMPOSITE PRESSURE VESSELS

BACKGROUND OF THE INVENTION

The present application claims under 35 U.S.C. §119, the priority benefit of U.S. Provisional Application No. 62/033,028, filed Aug. 4, 2014, entitled: "Vapor Cooled Shielding Liner for Cryogenic Storage in Composite Pressure Vessels." The disclosure of the foregoing application is incorporated herein by reference in its entirety.

FIELD OF THE INVENTION

The present embodiments herein relate to the field of storage tanks for fluid cryogens. In particular, the present embodiments herein relate to the field of cryogens such as, cryogenic fluid hydrogen stored in composite pressure vessels.

DISCUSSION OF THE RELATED ART

Cryogenic fluids, such as, hydrogen is known to be a desirable vehicular fuel for aerospace, marine, and terrestrial applications. Motivation comes from the fact that in many aerospace and unmanned aerial vehicle applications, the benefits of hydrogen outweigh the challenges. For example, beneficial aspects of hydrogen include the highest specific energy (J/kg) of any chemical fuel that is 2.8 times higher than conventional kerosene, rapid spill dispersion, ultra-green emissions, ease of production from water, and highly reliable and efficient solid state fuel cell power systems. However, a primary challenge with utilizing hydrogen fuel is storage.

In order to take advantage of the high specific energy of hydrogen, the associated tanks are preferably light weight—ideally being just a small fraction of the weight of the stored hydrogen (and preferably on the order of 10% to 25% of overall system weight). However, typical tanks for storing compressed gaseous hydrogen have a weight of about 10 to 20 times that of the hydrogen stored, and are not likely practical for high-altitude, long-duration aircraft. Moreover, liquid hydrogen powered long-endurance vehicles typically require tanks with sufficient insulation to prevent complete boil-off due to ambient heat for less than one to two weeks. An anticipated capacity of an individual tank might range from <1 to 2000 pounds of fluid hydrogen, depending on the configuration and size of the airplane.

The method of insulating a tank must deal with several types of heat transfer: conduction through solids, conduction and convection of fluid, and radiation. Most methods of effecting high-performance insulation rely on a vacuum to nearly eliminate the conduction and convection gas heat transfer. Solid conduction is conventionally reduced by having the insulated tanks supported in the vacuum by structural supports of high-strength to conductivity ratio (e.g., stainless steel, glass fiber, or Dacron fiber). Nonetheless, such systems have inherent problems that include cracking of the tank insulation due to mismatched coefficients of thermal expansion and pressure fluctuation induced swelling and a need for configured vacuum jackets to be continually purged of residual gas via vacuum pumping due to excessive hydrogen permeation through the tank wall. In addition, a weight intensive heat exchanger and electric heater are often required to heat the fuel to prevent condensation of air or water outside to piping outside the tank.

In spite of these challenges, use of hydrogen for fueling such vehicles has been demonstrated as an efficient and environmentally friendly solution. The most straightforward approach entails directly compressing the hydrogen and storing the room temperature gas in conventional high pressure vessels but the fuel density is not competitive from a capacity and performance standpoint with cryogenic hydrogen. Liquid hydrogen is typically stored in spherical tank structures, however, there are difficulties in manufacturing and incorporating tank structures (e.g., spherical tank structures) into existing Unmanned Aerial Systems (UAS) systems.

Thus, there is a need in the industry for a novel design and construction of a robust and light-weight, cryogenic compatible fuel tank with respect to hydrogen fuel storage to power vehicles, such as, but not limited to, automotive, aerospace and unmanned aerial vehicle systems. The embodiments herein address such a need by combining manufacturing systems with an inherent property of hydrogen to substantially reduce the hardware associated with a fuel tank, the end result of which is a novel effectively insulation-free, competitive, cost effective, cryogenic hydrogen fuel tank with inherent safety features for vehicles.

SUMMARY OF THE INVENTION

It is to be appreciated that the present example embodiments herein are directed to a cryogenic composite vapor cooled storage tank that is extremely lightweight and low volume with respect to the weight and volume of fluid that may be contained.

Thus, a first aspect of the present application is directed to a vapor cooled cryogenic pressure vessel liner for storing fluids that includes: a storage volume configured to contain a cryogenic fluid; and one or more passageways, each of which are additionally configured as one or more channels surrounding the storage volume; wherein the one or more channels collectively receive resultant cryogenic fluid vapor therethrough so as to provide for a configured plurality of insulating vapor layers that absorb heat from a source.

Thus, another aspect of the present application is directed to a vapor cooled cryogenic pressure vessel liner for storing fluids that includes: a storage volume configured to contain a cryogenic fluid; a primary passageway configured as one or more primary channels surrounding the storage volume, wherein the one or more primary channels are further configured to enable a catalyzed vapor of the cryogenic fluid; and one or more secondary passageways, each of which are additionally configured as one or more secondary channels surrounding the storage volume and the primary passageway; wherein the one or more primary channels in combination with the one or more secondary channels collectively receive catalyzed vapor therethrough so as to provide for a configured plurality of insulating vapor layers that absorb heat from a source.

BRIEF DESCRIPTION OF THE DRAWINGS

FIG. 1A shows a general cross-sectional view of a first embodiment of a lightweight, cryogenic-compatible pressure vessel.

FIG. 1B shows an enlarged cutaway cross-sectional view of the lightweight, cryogenic-compatible pressure vessel shown in FIG. 1A so as to highlight the novel passageways of the present application.

DETAILED DESCRIPTION

Figure 2B:
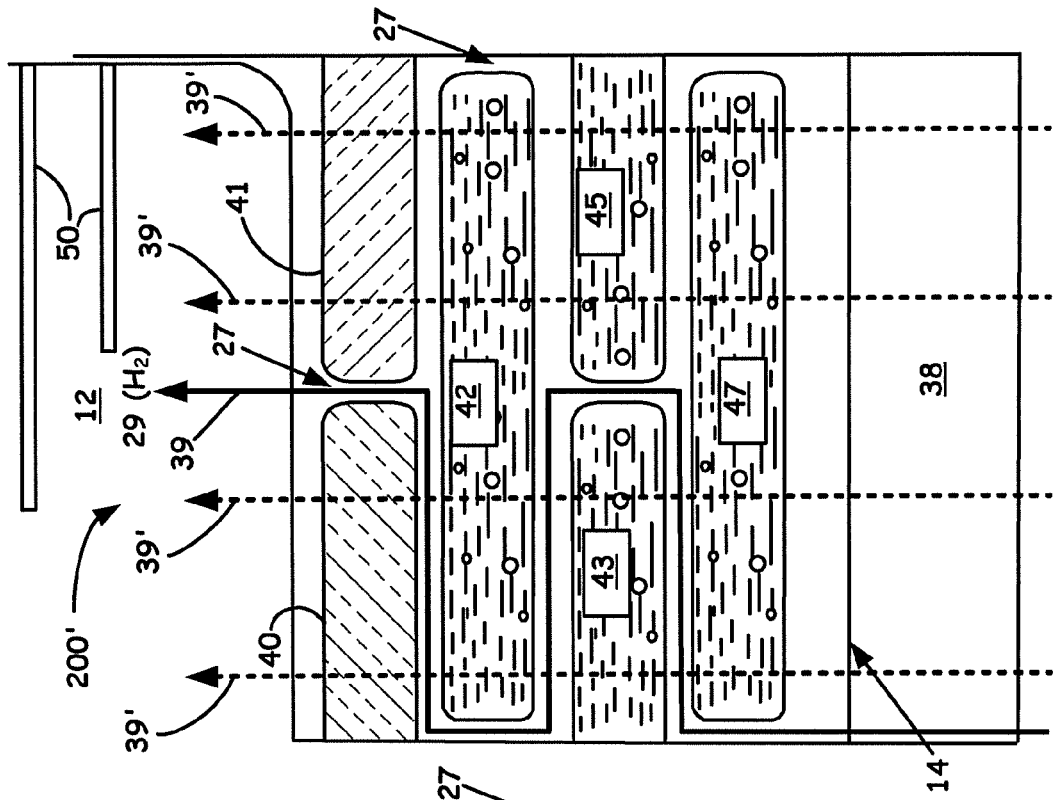
FIG. 2B shows another example general cross-sectional view of a Vapor Cooled Shield (VCS) tank embodiment to illustrate alternative primary and secondary flow passageways for hydrogen vapors.

In the description of the invention herein, it is understood that a word appearing in the singular encompasses its plural counterpart, and a word appearing in the plural encompasses its singular counterpart, unless implicitly or explicitly understood or stated otherwise. Furthermore, it is understood that for any given component or embodiment described herein, any of the possible candidates or alternatives listed for that component may generally be used individually or in combination with one another, unless implicitly or explicitly understood or stated otherwise. It is to be noted that as used herein, the term "adjacent" does not require immediate adjacency. Moreover, it is to be appreciated that the figures, as shown herein, are not necessarily drawn to scale, wherein some of the elements may be drawn merely for clarity of the invention. Also, reference numerals may be repeated among the various figures to show corresponding or analogous elements. Additionally, it will be understood that any list of such candidates or alternatives is merely illustrative, not limiting, unless implicitly or explicitly understood or stated otherwise.

In addition, unless otherwise indicated, numbers expressing quantities of ingredients, constituents, reaction conditions and so forth used in the specification and claims are to be understood as being modified by the term "about." Accordingly, unless indicated to the contrary, the numerical parameters set forth in the specification and attached claims are approximations that may vary depending upon the desired properties sought to be obtained by the subject matter presented herein. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the subject matter presented herein are approximations, the numerical values set forth in the specific examples are reported as precisely as possible. Any numerical values, however, inherently contain certain errors necessarily resulting from the standard deviation found in their respective testing measurements.

General Description

In the recent past, cryogenic compatible epoxy systems have been developed for composite (Types III, IV, and V) storage tanks. These epoxy systems (including dicyclopentadiene based resins, Stycast, MasterBond Supreme 10HTF, HYSOL, etc.) survive routine cryogenic thermal cycling and have demonstrated cryogen storage at temperatures as low as 2 K. Moreover, these resins are designed to be compatible with the metal or polymer liners (Types III and IV) and foam insulations.

However, as described in the background section above, such systems have inherent problems that include cracking of the tank insulation due to mismatched coefficients of thermal expansion and pressure fluctuation induced swelling and a need for configured vacuum jackets to be continually purged of residual gas via vacuum pumping due to excessive hydrogen permeation through the tank wall. Moreover, a weight intensive heat exchanger and electric heater are often required to heat the fuel from 20 K to ambient temperature to prevent condensation on fuel lines or freezing of a configured Nafion membrane.

The example embodiments disclosed herein are directed to lightweight pressure vessels that address such problems of foam insulation cracking, vacuum jacket permeation, and excessive heat exchanger weight via mitigation of such above described deleterious effects by the beneficial novel utilization of the concept of vapor cooled shielding (VCS). In general, the example embodiments disclosed herein utilize a novel pressure vessel design that beneficially capitalizes on VCS cryogenic fuel boil-off vapors to minimize thermal gradients along configured support structures so as to reduce heat loads on the system.

Also of note is that the example systems that can benefit from the designs disclosed herein include automotive, (cars, light or heavy duty trucks, motorcycles, motor homes, etc.), forklifts, boats, or transportation systems such as aerospace and unmanned aerial vehicle systems, or any alternative fuel vehicle that can utilize such pressure vessels without departing from the scope of the present application. It is also to be appreciated that the design of the embodiments disclosed herein are also configured to maximize time of operation for such vehicles listed above. The embodiments herein can also protect motors, pumps and electronics contained within the air frame or inside the fuel tanks of such vehicles. In addition, it is also to be noted that while liquid hydrogen, ($LH_2$) is the preferred fuel as disclosed herein, hydrogen can be supplied in other forms including cryo-compressed fluid or vapor and adsorbed on cryogenic storage materials, or other fuels may also be utilized which are suitable for cryogenic storage when coupled with the novel composite VCS tank designs as discussed and as disclosed throughout the four corners of the present application.

Accordingly, using vapor cooled shielding with a novel passageway design enables the disclosed herein lightweight composite cryogenic pressure vessel(s), wherein such vessels are capable of storing fluids, such as cryogenic liquids such as, but not limited to, liquid hydrogen, ($LH_2$) for vehicle fuel storage and powering applications. As part of the benefits, the pressure vessels herein are designed to store cryogenic fuels, (e.g. liquid hydrogen, "$LH_2$"), at cryogenic temperatures, which may vary depending on the fuel, and dispense fuel up to about ambient temperatures.

Specific Description

Turning now to the drawings, FIG. 1A illustrates, as generally referenced by the numeral 100, a longitudinal cross-sectional view of a first example embodiment of the lightweight, vapor cooled composite cryogenic pressure vessel 100, as disclosed herein. Such a cylindrical pressure vessel is often, but not necessarily configured along a central axis 1 and an inlet 8, an outlet 9, a top and bottom end cap 3, an outer wall liner 14, a plurality of passageways, 18, 20, and a configured end cap opening 19 (shown as an example slot) therebetween the plurality of passageways to enable hydrogen flow communication between separate passageways. These passageways can be appropriately spaced to incorporate continuous layers of insulating materials. In general, is to be noted that the boil-off vapors/fluid $LH_2$ enter a passageway inlet 11, is received by a first passageway 18, is directed through end cap opening 19 so as to be recirculated through one or more secondary passageways (e.g., 20), and is eventually directed out of outlet 9 so as to direct the fuel to power a system, as disclosed hereinafter.

The vapor cooled composite cryogenic pressure vessel 100 often but not necessarily has an elongated configuration (e.g., length to outer diameter aspect ratios varying from 1:1 to 5:1 and higher) along the central axis 1 and with capped ends 3. While such ends are disclosed in FIG. 1A as being flat, other end structures (i.e., rounded, hemispherical, etc.) that are typical of pressure vessel designs can also be utilized without departing from the scope of the present application. Moreover, while the cryogenic pressure vessel 100 is shown to be cylindrical in design, as shown in FIG. 1A, other geometric configurations, such as hemispherical, square, rectangular, spherical, rounded, irregular shapes, etc., can also be utilized depending on the design constraints of the vehicle/apparatus into which the pressure vessel 100 is designed to be incorporated.

As shown in FIG. 1A, the vapor cooled composite cryogenic pressure vessel 100 includes the plurality of passageways 18, 20 configured with a number of integrated ducts (channels), surrounding and enclosing a storage volume 12 with the outer wall liner 14 surrounding such passageways 18, 20 therebetween. Access for cryogenic fuel into the storage volume 12 is by way of the aforementioned inlet port 8 with outlet for the fuel, e.g., boil off, is via an outlet port 9 directly connecting to the plurality of passageways 18, 20 and outer wall liner 14.

The outer wall liner 14 and the passageways (insulating layers) 18, 20 formed therebetween are configured from materials to provide a lightweight rigid body construction capable of fuel storage pressures and pressures induced from boil-off of Liquid hydrogen when subjected to desired operating temperatures. As appreciated in the art of pressure vessels, weight is of critical importance, especially for vehicular mechanisms such as, but not limited to, automotive, spacecraft and more often Unmanned Aerial Systems (UAS) systems. Thus, with respect to the present application, the outer wall liner 14 and the passageways 18, 20 are designed to provide such a lightweight rigid structure by configuring the vessel 100 from materials, preferably composite materials that have a high strength-to-weight ratio so as to withstand high pressures from within the fuel storage volume 12 and boil-off vapors from within the one or more passageways 18, 20.

In that light, the vessel 100 disclosed herein is desirably constructed from a lightweight composite material using manufacturing methods known in the art. Preferably, the cryogenic pressure vessel 100 is formed from a lightweight non-metallic material, such as a polymer in order to achieve substantial weight reduction with a resultant high strength-to-weight ratio. Exemplary polymeric materials include, but are not strictly limited to, polystyrene, polyethylene, polyamide (nylon), polyimide (Kapton), or other polymers. In addition, some configurations may introduce fibers (e.g., polyester, glass, carbon, etc.) into a thermoplastic or thermosetting plastic to produce a plastic composite to enable the lightness in weight while also providing resistance to corrosion, fatigue and catastrophic failure. In particular, with respect to composite materials, such materials are often desired because the designed combination of two or more of chosen distinct materials provide for a resultant material with properties that cannot be achieved by any of the components acting alone, such as, but not limited to the aforementioned high strength-to-weight ratio property stated above. Other materials, such as, but not limited to, intermetallics, ceramics, other plastics known to those skilled in the art, or even metals can also be incorporated to provide such composite structures (e.g., polymers/ceramic, polymers/metal, and metal/ceramic) and thus enable high stiffness and strength properties suitable for use in forming the cryogenic pressure vessel 100 disclosed herein, depending on the design constraints of the particular application.

The example vapor cooled composite cryogenic pressure vessel 100, as shown in FIG. 1A has been demonstrated to be fabricated with a 3D printer (e.g., Connex or uPrint 3D printers) that allows the simultaneous printing of various materials. 3D printers are beneficial for the vessels 100 herein because the ultimate shape of the desired object (i.e., the composite pressure vessel 100) can be specified by a computer or an operator using a computer interface to a 3D printer. Also beneficial in using such a 3D printer is that the resultant constructed composite pressure vessel 100 object is consistent because it is constituted of output materials, e.g., polymers, plastics, composites, etc., that the incorporated printer uses. In some cases, more than one composite may be used.

While a 3D printer has been used to make the example vapor cooled composite cryogenic pressure vessel 100 shown in FIG. 1A, it is also to be understood that other techniques may additionally be used for making the disclosed structures of the present application. For example, other techniques can include block copolymer chemistry, rapid prototyping, laser sintering, interference lithography, photolithography, stereo lithography, and self-propagating polymer waveguides. In addition, other manufacturing processing techniques to make the cryogenic pressure vessels 100 disclosed herein include, but is also not limited to, injection molding, thermal forming, as well as any other suitable process known to those skilled in the art.

As known to those of ordinary skill in the art, cryogenic storage of $LH_2$ requires insulation techniques/configurations to provide for the overall cryogenic storage mechanism while preventing deleterious effects, such as unwanted amounts of boil-off. In particular with respect to the novel design of the vessel 100 as shown in FIG. 1A, heat ingress is minimized (i.e., conduction, convection, or radiation heat transfer) in a pre-designed fashion via a desired optimal number between 2 up to about 40, more often between 2 up to about 8 configured passageways 18, 20 that each have a predetermined number of integrated ducts (channels), wherein each passageway results in an insulating layer (volume). The ducts can be spaced appropriately or stacked to allow continuous insulation layers between ducts or between the ducts and storage volume 12. With respect to the design of the integrated ducts, each prescribed duct is configured with a wall thicknesses between about 0.02 cm up to and above about 1 cm to allow flow of vapors, $LH_2$, and or to hold catalytic materials that react with a form of $LH_2$ in a known prescribed manner, as to be detailed herein.

It is to be appreciated that depending on the application (e.g., if the vessel 100 is utilized in the hot desert sun in an Unmanned Aerial System as opposed to be utilized in a car in the city) the number of layers are designed to vary. In this embodiment, an in conductive heat loss through the vessel 100 passageways 18, 20 is greater than the decrease in radiative heat flux provided by a larger number of insulating layers (i.e., passageways 18, 20). In addition, the thickness of about 0.06 cm up to about 0.6 cm for the outer wall liner 14 (e.g., a polymer) and the passageway(s) 18, 20 duct thickness of about 0.02 cm up to about 1 cm are configured in a relationship to be as thin to maximize storage volume as needed but also with inter-related prescribed thicknesses. In particular, such prescribed inter-related thicknesses enable resultant insulating configurations to provide the desired mechanical support so as to withstand the maximum internal pressure and bending forces while also providing the designed heat conduction from the ambient outside portion of the vessel 100 to the fuel storage volume 12. It is also to be appreciated that within the structure, all layers need not be of uniform thickness or of the same material.

FIG. 1B shows a cross-sectional view (as indicated in FIG. 1A by the denoted double arrows) of a portion of the vapor cooled composite cryogenic pressure vessel 100 to provide a 3-dimensional insight to the passageways 18, 20 novel structural characteristics. FIG. 1B in particular, shows the fuel storage volume 12 being disposed within the enclosing outer wall liner 14 with the passageways 18, 20 shown in FIG. 1A being a configured plurality of resultant of formed ducts 32, 33, 35, as also detailed in FIG. 2A. As previously noted, ducts 32, 33, 35 in addition to the constructed wall supports 27 are with designed thicknesses of about 0.02 cm up to about 1 cm depending on the design constraints of vessel 100 in a given application. Such wall supports 27 and the associated ducts provide the heat conduction path from the ambient or a prescribed heat source so as to enable a prescribed heating of the fuel storage volume 12. While the formed exemplary ducts 32, 33, 35 are shown with such a geometry, it is to be understood that the geometries can still vary depending on the overall geometry of the overall pressure vessel 100 design (e.g., if rectangular instead of cylindrical, etc.) or if the passageways 18, 20 that are within the bounds of the formed ducts are instead provided with different structures, such as, but limited to a plurality fiber-like conduits for hydrogen vapor/gas transport. Other geometries thus include spherical, rectangular, square, rounded geometries, hemispherical, etc.

Turning back to the figures starting with FIG. 1A, the following discussion is utilized in a non-limiting fashion to illustrate an example more detailed working methodology of the vapor cooled composite cryogenic pressure vessel 100, as disclosed herein. In operation, the pressure vessel 100 is configured as a fuel storage volume 12 (i.e., tank) and coupled to a vehicle, such as, but not limited to, a car, a light or heavy duty truck, a motorcycle, a motor home, a boat, an aerospace and/or even an unmanned aerial vehicle system. The derived fuel from the cryogenic pressure vessel 100 often powers a fuel cell that reacts with air as an oxidizer and if the air is ambient air, this allows for continuous operation. Moreover, storing the $LH_2$ as a fluid in the fuel storage volume 12 provides for the $LH_2$ storage volume to be small relative to gaseous storage volumes and thus enable the cryogenic pressure vessel 100 to be small enough but if desired, also large enough, to fit reasonable configurations when coupled to power any of the vehicular systems listed above.

To provide $LH_2$, for example to a fuel cell in the overall system (not shown), heat is either generated in, but more often delivered to, the pressure vessel 100 by a heat source. Often, but not necessarily, the heat source is any ambient heat source that can be mitigated with the working embodiments disclosed herein or even a known heat source utilized by one of ordinary skill in the art, such as, for example, an electrical heating element. The particular heat source is thus configured or desired to beneficially increase the boiling-rate of the $LH_2$ disposed in the fuel storage volume 12 to one or more desired boiling-rates adequate to supply gaseous hydrogen ($H_2$) to the pressure vessel 100 at an operating-rate of flux. In particular, the pressure vessel 100 is configured to supply $H_2$ to a coupled fuel cell at a rate related to and/or determined by a boiling-rate rate adequate for power generation specifications. The pressure vessel 100 disclosed herein provides a novel structure and when coupled with the disclosed Vapor Cooling, aspect, as disclosed herein, enables desired thermal insulating and resultant pressure vessel 100 conductivity properties to ensue so that desired heat transport to the $LH_2$ stored in the pressure vessel 100 can result in such power generation specifications.

To illustrate the general concept of the embodiments herein, $LH_2$ is delivered through an inlet 8, as shown in FIG. 1A, in a way commonly understood by those skilled in the art and held in the storage volume 12, as generally described herein. As heat is received by the $LH_2$ via conduction through the pressure vessel 100 wall 14 and passageways 18, 20 from the ambient (e.g. heater) to the tank's cryogenic interior, the liquid hydrogen $LH_2$ disposed within the tank's cryogenic interior at some temperature rise causes evaporation, or "boil-off," and the vessel's pressure increases. By design of the system that includes the pressure vessel 100, the disposed $LH_2$ thus boils at a designed boiling-rate desired to produce gaseous hydrogen at the operating-rates of flux for a given vehicular application. Even more specifically, the pressure is designed to increase to a prescribed level wherein the hydrogen vapor can be vented through an outlet 9 to be received by a fuel cell integrated with overall system (not shown).

The problem however is that typically, cryogenic storage fuel systems suffer from too much heat ingress, resulting in $LH_2$ stratifying so as to increase the pressures to undesired levels that result in deleterious boil-off rates. The present example embodiments, as generally shown in FIG. 1A, addresses this problem by constructing the pressure vessel 100 in a novel fashion so as to capitalize on a process called vapor cooled shielding (VCS) so as to increase the cooling capacity of resultant hydrogen vapors. In particular, increasing the cooling capacity of hydrogen vapors and using it as a vapor shield is possible through manipulating hydrogen's nuclear spin isotopomers, called orthohydrogen and parahydrogen. However, due to quantum mechanics, parahydrogen is stuck in even rotational energy levels and cannot access the odd rotational energy levels of orthohydrogen without a catalyst.

Thus, the following provides additional insight as to capitalizing on the odd rotational energy levels of orthohydrogen. Specifically, the pressure vessel 100 herein is configured with a number of passageways 18, 20 between 2 up to about 40 and more often between 2 up to about 8 that in essence form a number of ducts therebetween, as discussed above. A number of the prescribed ducts (channels), e.g. 32, 33 are then initially configured with a catalyst material, such as, but not limited to a paramagnetic material (e.g., Fe (OH) 3 or CrO3), which for example, can be, but not necessarily, configured as a coating on the surface of the inner walls of the passageways 18, 20, or provided as another non-limiting example, as a mixture of a para to ortho catalyst (e.g., finely granulated para to ortho catalyst), such as the aforementioned particulate paramagnetic material (e.g., ferric oxide) embodied in a foam-forming material that is disposed within a particular passageway 18, 20. Other catalyst materials that can also be utilized herein within a passageway 18, 20, as disclosed herein include, activated carbon, platinized asbestos, rare earth metals, uranium compounds, predetermined nickel compounds, or para to ortho catalysts implemented in light-weight aerogels.

Figure 2A:
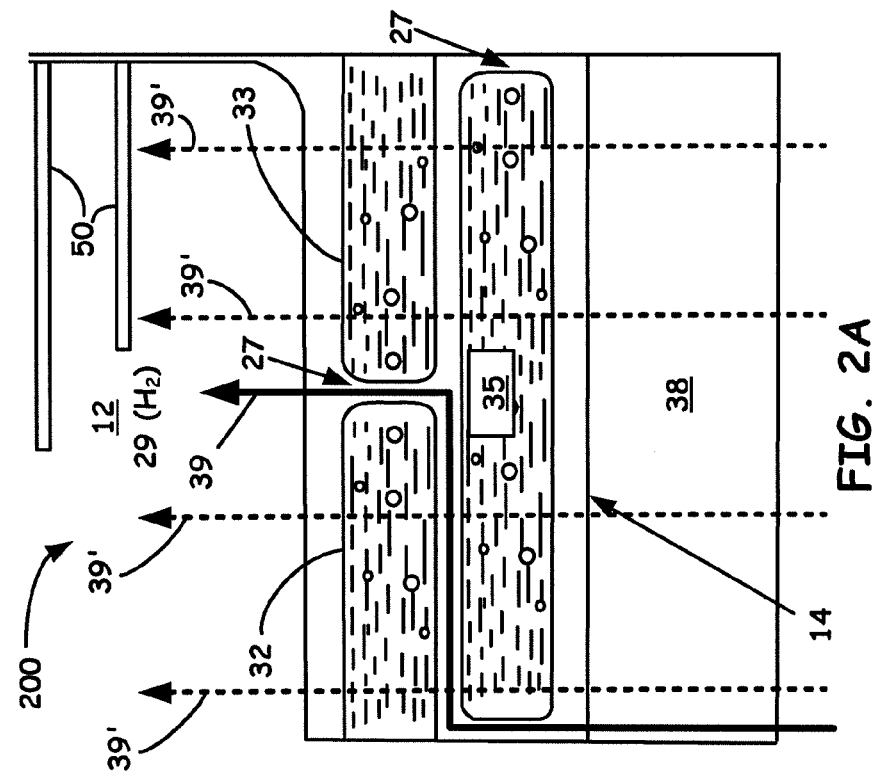
FIG. 2A shows a general cross-sectional view of a Vapor Cooled Shield (VCS) tank example embodiment to illustrate the primary and secondary flow passageways for hydrogen vapors.

To even further illustrate the configuration, FIG. 2A (which is a cross-sectional view taken from FIG. 1A as well as FIG. 1B) as generally referenced by the numeral 200, and FIG. 2B, as generally referenced by the numeral 200', are shown as exemplary possible, but not only, embodiments of the pressure vessel 100 passageway design. In combination with FIG. 1A, the figures are collectively utilized to describe the working example vapor cooled concept and embodiments of the present application. In particular, FIG. 2A and FIG. 2B show in more detail a plurality of formed ducts (e.g., 32, 33, 35 in FIG. 2A and 42, 43, 45, and 47 in FIG. 2B) that provide for channels that can transport liquid and/or gaseous hydrogen (as denoted by the dashed lines with bubble-like spheres).

Accordingly, as heat from the surrounding exterior environment or heat generated from provided conventional element, which ranges from about 20 degrees Kelvin up to about ambient temperature, enters the outer wall 14 (see FIG. 1A), heat is conducted through the outer wall 14, through solid material and along wall supports 27 (39 as shown in FIG. 1B and FIG. 2B, as also denoted with an example solid arrowed pathway) as well as through all of the materials, (i.e., through duct containing materials in addition to solid vessel 100 material, as also shown in FIG. 1B and FIG. 2B and as denoted by dashed arrows 39'), from the warmest to the coldest regions, so as to eventually begin to heat the stored liquid hydrogen (LH$_2$) 29. At a particular desired heat level, the stored volume 12 begins to boil off liquid hydrogen (LH$_2$) 29 within the tank's cryogenic interior (as stated above). At some predetermined pressure due to ingress of temperature, the evaporation or "boil-off," enables resultant liquid/fluid//gaseous hydrogen to be directed through a passageway inlet 11 so as to thereafter follow along a path along a first passageway 18 (see solid arrow 18' in FIG. 1A) of formed ducts 32, 33, as shown in FIG. 2A and 42, as shown in FIG. 2B (dashed lines and bubble-like spheres within the ducts denote fluid, gaseous, and/or liquid hydrogen).

As previously stated, the formed ducts 32, 33, and 42, which herein are often deemed primary passageways for simplicity of understanding only, are often utilized to be incorporated with para-ortho catalysts (not shown), as listed above. Thus, as the fluid/gaseous/liquid hydrogen, which is primarily consisting of para-hydrogen enters the primary passageway of formed ducts 32, 33, 42, it is contacted by the para-to-ortho-hydrogen catalyst material and converted from para to gaseous ortho-hydrogen. This converted gaseous para to ortho-hydrogen then is directed to the bottom end cap 3 region of pressure vessel 1, as shown in FIG. 1A, and allowed to expand out into a conjoining region 21 with primary passageway 18 so as to be directed through an end cap opening 19 configured in the bottom end cap region 3. Thereafter, the converted gaseous ortho-hydrogen is directed along one or more deemed secondary passageways, as denoted by the dashed arrow 20' in FIG. 1A (as also denoted by the reference numeral 35 in FIG. 2A and 43, 45, and 47 in FIG. 2B) that can, but are not often configured with catalytic material (not shown). As stated above, such added secondary passageways provide additional insulation, strength, etc. for the pressure vessel 100 designs herein. The gaseous hydrogen fuel is thereafter directed to outlet 9, as shown in FIG. 1A, so as to be received for example, by one of the disclosed example systems/apparatus herein.

In any event, the number of integrated formed ducts, e.g., 32, 33, 35 in FIG. 2A and 42, 43, 45, and 47 in FIG. 2B, in combination with and as integrated with their respective passageways 18, 20, in essence provide for a multi-layer insulating structure. As the number of layers, i.e., passageways 18, 20 increases, the insulation capability is also increased. Thus, the heat load to the LH$_2$ within the storage volume 12 is protected by the endothermic reaction of para-hydrogen to ortho-hydrogen induced by the para-to-ortho-hydrogen catalyst particles embedded in desired formed ducts 32, 33, 42, 43, 45, and 47. This conversion of para-to-ortho-hydrogen and thus manipulation of hydrogen's nuclear spin isotopomers results in a shielding vapor within the ducts so as to provide for an insulating layer, i.e., deemed vapor cooled shielding (VCS), as disclosed herein). Specifically, by providing for a desired number of passageways 18, 20, and a given thickness of the VCS as provided by duct thicknesses and number, the thermal conductivity integrity of the pressure vessel is maintained to provide desired heat flow along path 39, as shown in FIG. 2A and 2B, to the storage volume 12. Moreover, such an arrangement in essence increases the cooling capacitance of the hydrogen vapors and thus increases the insulating capabilities altogether. It is to be noted however, that while catalyst materials can be incorporated herein to provide for the vapor cooling shielding, the invention can also be utilized without a catalyst material when using cryogenic fluids within the storage volume 12. In such a scenario, the boil-off vapors within the storage volume due to ingress of heat are recirculated into the plurality of ducts embodied in the passageways and the resultant disposed vapors within the integrated ducts provide for insulation of the tank.

Figure 3A:
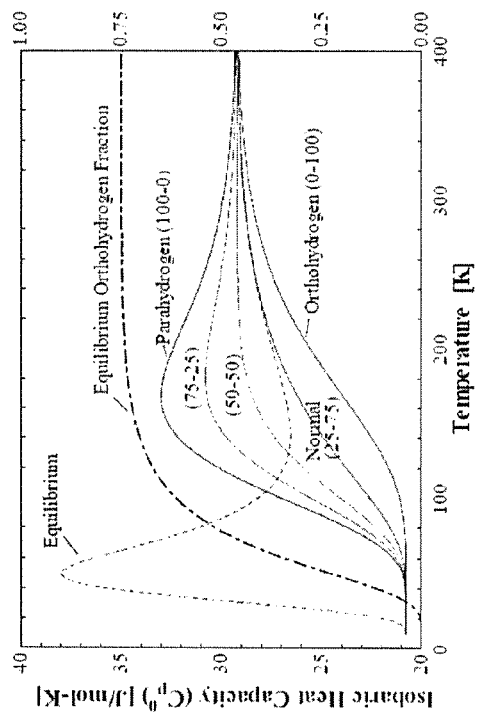
FIG. 3A shows Ideal-gas isobaric heat capacities and equilibrium orthohydrogen fraction plots at cryogenic temperatures.
Figure 3B:
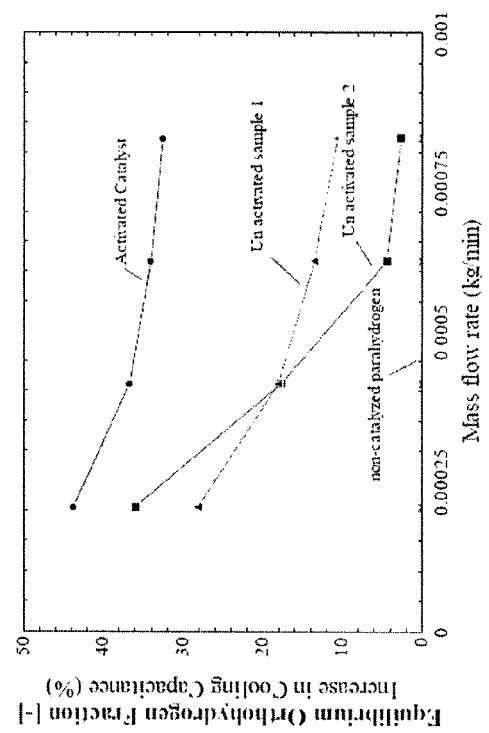
FIG. 3B shows measured increasing cooling capacitance plots between 20 and 90 K for Vapor Cooled Shielding (VCS) applications.

Turning now to FIG. 3A and FIG. 3B, such figures are utilized to illustrate the isobaric heat capacities of parahydrogen-orthohydrogen mixtures. Specifically, FIG. 3A shows Ideal-gas isobaric heat capacities and equilibrium orthohydrogen fraction at cryogenic temperatures and FIG. 2B shows measured increases in cooling capacitance between 20 and 90 K for Vapor Cooled Shielding (VCS) applications. Thus, the figures illustrate the isobaric heat capacities of parahydrogen-orthohydrogen mixtures wherein the cooling capacity of each composition is the integral of the area under each curve. The enthalpy of conversion from parahydrogen to orthohydrogen is 700 kJ/kg, substantially higher than the latent heat of vaporization of 420 kJ/kg at the normal boiling point. When hydrogen is exposed to a catalyst during heating, the endothermic reaction is enabled and the 'equilibrium' heat capacity curve is followed, causing a theoretical increase in cooling capacity of 50% between 20 and 90 K.

Other example embodiments to be included with the designs herein include foam insulation, one or more slosh baffles, and overwraps, often strengthening fiber wraps, of the overall pressure vessel. Thus, with respect to foam insulation, foams as utilized herein are beneficial because the material does not require a vacuum. In addition, the use of foams generally provide a barrier to heat conduction due to their low density. Turning back to FIG. 2A and FIG. 2B, foam insulation can thus be coupled to inner the wall of the storage volume of FIG. 2A (not shown) having a thickness, for example, of 1 cm up to about 7.5 cm, or embedded (denoted as diagonal dashed and solid lines) within configured ducts, 40, 41, as shown in FIG. 2B, as provided by, for example, the 3D printing methods utilized herein. Example foam insulation includes, polystyrene foam, polyurethane foam, polyamide foam, and foam glass.

With respect to one or more slosh baffles, 50 as shown in FIG. 2A and FIG. 2B, it is known that another source of boil-off, in this case undesired boil-off, is due to sloshing, i.e., the motion of a liquid inside a vessel caused by acceleration and deceleration, which transforms some of the liquid's kinetic energy and impact energy. With respect to the present application, sloshing can be problematic for example, for vehicles in a city driving environment and for transporting large volumes of liquid fluids in Unmanned Aerial Systems (UAS). Specifically with respect to Unmanned Aerial Systems, sloshing is even more problematic in that the slosh motions in the vessel 100, as shown in FIG. 1A, can during travel, affect vehicle stability and control. Accordingly, the pressure vessels herein can also be configured with slosh inhibiting foam (not shown) or one or more slosh baffles 50, as shown in FIG. 2A and FIG. 2B, to reduce swirl resulting from slosh and to prevent entrapment of gases in the delivered $LH_2$. The one or more baffles 50 can be any shape capable of use with the present application (e.g., conical) and contiguously attached to, for example at least one sidewall and extending into the internal cavity that contains disposed liquid cryogenic fluid.

With respect to overwraps, e.g. carbon/glass or other fiber overwraps, 38 as shown in FIG. 2A and FIG. 2B, the over-wrap 38 is, as known to one of ordinary skill in the art, often a safety feature while also providing integrity of the inner vessel 100, as disclosed herein. The overwrap is in contact with and encloses the outer wall 14, as shown in FIG. 2A and 2B. While the overwrap can enclose entirely, it is to be also understood that based on design constraints, the overwrap can also be partial or may not be needed at all. As an example over-wrap configuration material, such an overwrap 38 is often, but not necessarily, a composite having a positive coefficient of thermal expansion by virtue of including non-carbon fibers such as glass so that it contracts when cooled. Such an over-wrap 38 can also often have an inner member that is configured from a composite having a negative coefficient of thermal expansion by virtue of including carbon fibers having a negative coefficient of thermal expansion, which results in the inner member having a desired high strength-to-weight ratio. Other materials other than carbon fiber may also be used.

Turing back to the discussion of the benefits of the lightweight, vapor cooled composite cryogenic pressure vessel 100, it is also to be appreciated that although the overall temperature difference between the cryogenic fuel and the environment remains the same with VCS, the resistance to heat transfer can vary substantially because thermal conductivity is a strong function of temperature at cryogenic conditions. For example, the thermal conductivity of many polymers, specifically Nylon, decrease nearly an order of magnitude between 10 and 100 K. The overall heat transfer is then directly reduced via the temperature of the tank wall through VCS, therefore polymers used for the tank designs herein may be chosen strategically for their range of conductivities at operating temperature.

Accordingly, the present embodiments herein utilizes configurations and mechanisms is designed to decrease the tank wall temperature and maintain the conductivity of the wall material (e.g., polymer). To reiterate that as described above, the configurations and mechanisms to be utilized herein include: providing for a desired number of passageways (to include integrated ducts (channels)) and a given thickness of the VCS, reducing the thermal conductivity of the VCS material, and increasing the cooling capacitance of the hydrogen vapors. The latter two mechanisms are the least mass intensive and control the minimum number of passageways and required thickness of the VCS.

It is to be understood that features described with regard to the various embodiments herein may be mixed and matched in any combination without departing from the spirit and scope of the invention. Although different selected embodiments have been illustrated and described in detail, it is to be appreciated that they are exemplary, and that a variety of substitutions and alterations are possible without departing from the spirit and scope of the present invention.

We claim:

1. A storage device for storing cryogenic fluids, comprising:
a vessel that surrounds and encloses a storage volume configured to contain a cryogenic fluid; and
a wall of the vessel having a thickness dimension extending from an outside of the wall to an inside of the wall, the wall having integrally formed within the thickness dimension a plurality of channels, wherein at least one of the plurality of channels is in fluid communication with the storage volume to receive vapors boiled off the cryogenic fluid and one of the plurality channels is in fluid communication with an outlet to permit the vapors to exit the outlet, and wherein the plurality of channels surround the storage volume, and wherein at least some of the plurality of channels are formed at relatively different depths in the thickness dimension of the wall so that the vapors boiled off the cryogenic fluid form a plurality of insulating vapor layers at the relatively different depths in the thickness dimension of the wall that absorb heat from a source,
wherein one or more of the plurality of channels include a catalyst therein which produces a catalyzed vapor from the vapors boiled off from the cryogenic fluid, and
wherein the catalyst is a para to ortho catalyst to convert para-hydrogen to ortho-hydrogen.

2. The storage device of claim 1, wherein the vessel has a shape selected from the group consisting of hemispherical, square, rectangular, and spherical.

3. The storage device of claim 1, wherein the vessel has an elongated configuration with a length to outer diameter aspect ratio varying from 1:1 up to 5:1.

4. The storage device of claim 1, wherein a distance between the at least some of the plurality of channels formed at relatively different depths in the thickness dimension of the wall ranges from 0.06 cm up to 0.6 cm.

5. The storage device of claim 1, wherein at least some of the plurality of channels are configured with shapes selected from the group consisting of spherical, rectangular, square, and hemispherical.

6. The storage device of claim 1, wherein the plurality of channels includes a number of channels ranging from 2 up to 40.

7. The storage device of claim 1, wherein at least some of the plurality of channels are configured with thicknesses from 0.02 cm up to 1 cm.

8. The storage device of claim 1, wherein the vessel is comprised of one or more of a polymeric material and metal.

9. The storage device of claim 8, wherein the polymeric material is selected from the group consisting of a polystyrene, a polyethylene, a polyamide, and a polyimide.

10. The storage device of claim 1, wherein the vessel liner is comprised of at least one composite selected from the group consisting of a polymer/ceramic, a polymer /metal, and a metal/ceramic.

11. The storage device of claim 1, wherein the vessel is comprised of at least one material selected from the group consisting of an intermetallic, a metal, a ceramic, and a plastic.

12. The storage device of claim 1, wherein the para to ortho catalyst is selected from the group consisting of a paramagnetic material, an activated carbon, a platinized asbestos, a rare earth metal, a uranium compound, and a nickel compound.

13. The storage device of claim 1, further comprising at least one foam insulation associated with the wall, the at least one foam insulation selected from the group consisting of a polystyrene foam, a polyurethane foam, a polyamide foam, and a foam glass.

14. The storage device of claim 1, wherein the vessel is configured to fuel a vehicle selected from the group consisting of a car, a truck, an aircraft, a forklift, a motorcycle, a motor home, a boat, an aerospace vehicle, or an unmanned aerial vehicle system.

15. The storage device of claim 1 wherein the para to ortho catalyst is finely granulated and is incorporated in or coated on surfaces of the one or more of the plurality of channels.

16. The storage device of claim 15 further comprising an aerogel wherein the para to ortho catalyst is embedded in the aerogel and the aerogel is coated on the surfaces of the one or more of the plurality of channels.

17. The storage device of claim 1 wherein the vessel is a liner which fits within or is formed within a tank.

18. A vapor cooled cryogenic pressure vessel liner for storing fluids, comprising:
- a storage volume defined by the liner and configured to contain a cryogenic fluid;
- a primary passageway integrally formed in the liner configured as one or more primary channels surrounding the storage volume, wherein at least one of the one or more primary channels is configured to form a catalyzed vapor from boiled off vapors of the cryogenic fluid; and
- one or more secondary passageways integrally formed in the liner, each of which are additionally configured as one or more secondary channels surrounding both the storage volume and the primary passageway;
- a catalyst in the one or more primary channels or the one or more secondary channels which produces a catalyzed vapor from vapors boiled off from the cryogenic fluid, wherein the catalyst is a para to ortho catalyst to convert para-hydrogen to ortho-hydrogen,
- wherein the one or more primary channels in combination with the one or more secondary channels collectively receive catalyzed vapor therethrough so as to provide for a configured plurality of insulating vapor layers that absorb heat from a source.

* * * * *